United States Patent [19]

Ito et al.

[11] Patent Number: 5,035,959
[45] Date of Patent: Jul. 30, 1991

[54] STEEL BODY HAVING CERAMIC TIP SOLDERED THERETO

[75] Inventors: Masaya Ito; Masato Taniguchi, both of Nagoya City, Japan

[73] Assignee: NGK Spark Plub Co., Ltd., Nagoya City, Japan

[21] Appl. No.: 449,061

[22] Filed: Dec. 18, 1989

Related U.S. Application Data

[63] Continuation of Ser. No. 183,157, Apr. 19, 1988, abandoned.

[30] Foreign Application Priority Data

Apr. 20, 1987 [JP] Japan .................................. 62-95235

[51] Int. Cl.$^5$ ................................................ F01L 1/18
[52] U.S. Cl. ............................. 428/627; 428/673;
428/680; 428/684; 123/90.39; 123/90.51
[58] Field of Search ................ 428/627, 660, 673, 675,
428/676, 680, 684; 123/90.39, 90.51

[56] References Cited

U.S. PATENT DOCUMENTS

| 4,591,535 | 5/1986 | Mizuhara | 428/627 |
| 4,623,513 | 11/1986 | Mizuhara | 228/263.11 |
| 4,740,429 | 4/1988 | Tsuno | 428/627 |

FOREIGN PATENT DOCUMENTS 90879  5/1985  Japan .............................. 228/263.12

OTHER PUBLICATIONS

*Making, Shaping, and Treating of Steel*, 9th ed., 1971 (McGannon, H., ed).

Primary Examiner—R. Dean
Assistant Examiner—George Wyszomierski
Attorney, Agent, or Firm—Foley & Lardner

[57] ABSTRACT

A body, like a rocker arm, is disclosed which comprises a base body fabricated of a Ni-Cr-Mo type steel which contains less than 8 wt % Cr; and a ceramic tip soldered to a given portion of the base body. The soldering is so made as to increase the hardness of the base body.

10 Claims, 1 Drawing Sheet

STEEL BODY HAVING CERAMIC TIP SOLDERED THERETO

This application is a continuation of application Ser. No. 07/183,157, filed Apr. 19, 1988 abandoned.

BACKGROUND OF THE INVENTION

1. Field of the Invention

The present invention relates in general to a body comprising a steel member serving as a base body and a ceramic member soldered thereto, and more particularly to the bodies of a type which is particularly used as an engine component, such as rocker arm, intake valve, exhaust valve, valve lifter, piston, turbo-charger rotor or the like.

2. Descritpion of the Prior Art

In order to clarify the task of the present invention, the description will be commenced with respect to a conventional metal type rocker arm used in an internal combustion engine.

For production of the rocker arm, a steel such as S40C steel (Japanese Industrial Standard) is forged to provide a base body. The base body is thermally treated to achieve homogenization thereof. Then, the body is machined to form a contact portion. A wear tip of metal is welded to the contact portion by means of high frequency welding. Thereafter, the body is finely machined to have required shape and dimension.

However, it has been revealed that usage of the metal wear tip shortens the life of the rocker arm because of the poor durability of the metal tip against wearing.

In view of this drawback, several measures have been hitherto proposed, one being disclosed in Japanese Utility Model First Provisional Publication No. 59-91404, and the other being disclosed in Japanese Patent First Provisional Publication No. 61-191572. That is, in the former case, a wear tip made of a ceramic is soldered to a metal rocker arm body with a certain buffer member interposed therebetween. The buffer member is used to relax the thermal expansion difference between the ceramic tip and the metal rocker arm body. In the latter case, a martensite type stainless steel is used as the rocker arm body. In this case, the hardening of the body is secondarily achieved by the heat applied when the wear tip is welded to the rocker arm body.

However, these two measures still have the following drawbacks. That is, in the former case, the heat applied for welding the ceramic tip to the rocker arm body tends to anneal the metal rocker arm body to an impracticable degree. Furthermore, in the latter case, the production cost of the rocker arm is increased considerably because of usage of the martensite type stainless steel which is expensive.

SUMMARY OF THE INVENTION

It is therefore an object of the present invention to provide a body comprising a steel base member and a ceramic member soldered thereto, which is free of the above-mentioned drawbacks.

According to the present invention, there is provided a body which comprises a base body fabricated of a Ni-Cr-Mo type steel which contains less than 8 wt % Cr; and a ceramic tip soldered to a given portion of the base body to increase the hardness of the body.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
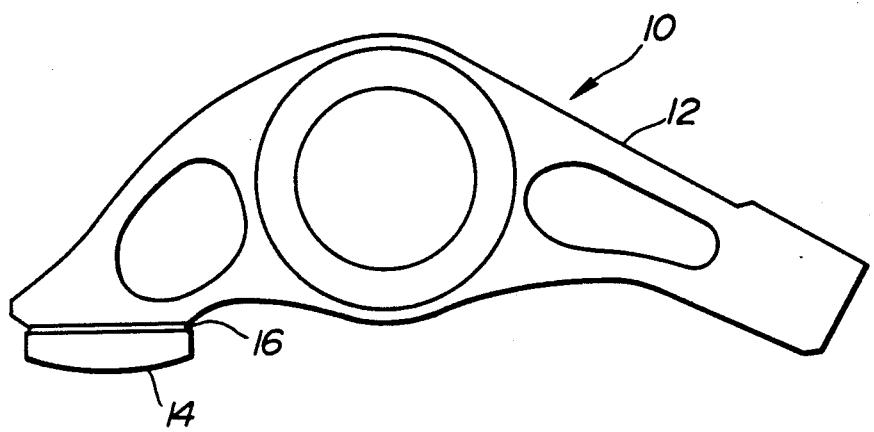
FIG. 1 is a view of a rocker arm of an embodiment of the present invention.

In order to discover a measure for solving the above-mentioned drawbacks encountered in the conventional rocker arm, the applicants have carried out various examinations and tests on rocker arms of the type as shown in FIG. 1 and finally discovered the following facts.

When a Ni-Cr-Mo type steel which contains less than 8 wt % Cr is used as a body of a rocker arm, soldering a ceramic tip to the body with a considerable heat and cooling the same thereafter increases the hardness of the steel body.

In particular, when the Ni-Cr-Mo type steel body comprises 0.3 to 1.5 wt % Mn, 1 to 5 wt % Ni, less than 8 wt % Cr, less than 1.5 wt % Mo, 1 wt % Si, less than 1 wt % W, less than 1 wt % V, not less than 0.04 wt % C and a trace of S and P as unavoidable impurities, the body hardening phenomenon is much assured.

Preferably, the body has the hardness of 20 in $H_RC$ (Rockwell Hardness, C-scale) and over when the soldering is completed.

When the body and the ceramic tip are finely machined before they are soldered, the hardening of the body is excellently improved.

The examinations and tests carried out by the applicants have further revealed other important facts which will be summerized in the following.

Ni is an element which reduces the critical cooling speed. 1 to 5 wt % of Ni is available. However, when considering the productivity and cost of the rocker arm, 3 wt % of Ni is preferred.

Cr is an element which not only reduces the critical cooling speed but also increases the heat resistance of the steel body of the rocker arm. When the rocker arm is used in a temperature less than 200° C., less than 2 wt % Cr is necessary, and when the rocker arm is used in a temperature of about 400° C., about 3 wt % Cr is necessary.

Mo is an element which reduces the critical cooling speed. In addition to this function, Mo can stabilize the forging characteristic of the steel body.

Figure 2:
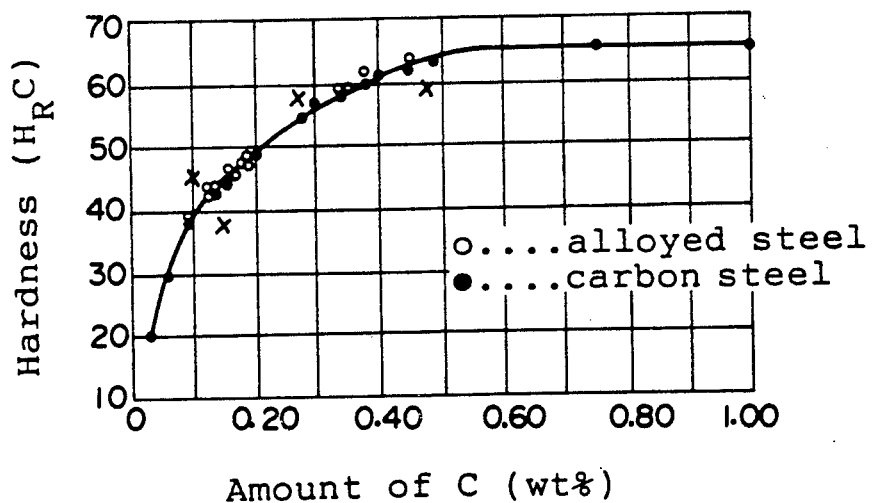
FIG. 2 is a graph showing the hardness of a steel body of the rocker arm with respect to the amount of carbon contained therein.

C has a direct effect on the hardness of the finished steel body of the rocker arm. As is seen from the graph of FIG. 2, at least 0.04 wt % of C is necessary for providing the steel body with a sufficient hardness (viz., at least 20 in $H_RC$).

The present invention will be further described by the following nonlimitative examples.

For these examples, three rocker arms were produced each having a structure as shown in FIG. 1. That is the rocker arm 10 comprises a steel body 12, and a ceramic wear tip 14 secured to a given portion of the steel body 12. Designated by numeral 16 is a buffer member which is interposed between the metal body 12 and the tip 14 for achieving a strong bonding therebetween. The compositions of the steel bodies of the examples in green condition are shown in TABLE-2.

EXAMPLE—"I"

A silicon nitride based ceramic wear tip having a size of 18 mm in length and 16 mm in width was prepared. After lining a given portion of the wear tip with a titanium film (viz., Ti) by means of a sputtering method, the tip was welded to a steel body fabricated of SNCM 616 (JIS, which had the hardness of 13.4 in $H_RC$). For this welding, a copper plate L (Cu) of 0.5 mm in thickness was used as a buffer member and a Ag-Cu solder was applied to the contacting portion between the tip and the body and heated at about 925° C. for about 10 minutes. Thereafter, the body was cooled to about 300° C. in a nitrogen gas atmosphere for 15 minutes.

The body thus cooled exhibited the hardness of 35.6 in $H_RC$. After annealing at a temperature of 200° C., the body showed the hardness of 34.5 in $H_RC$.

EXAMPLE—"II"

A given portion of a silicon nitride based ceramic wear tip was cleaned, and the tip was welded to a steel body fablicated of the materials shown in TABLE-2. For this welding, a copper plate (Cu) having a thickness of 0.5 mm was used as the buffer member, and a Ti-Cu solder was applied to the contacting portion between the tip and the body and heated at 925° C. for 5 minutes. The body was then cooled under the same condition as the EXAMPLE "I". The body thus cooled showed the hardness of 30.2 in $H_RC$.

EXAMPLE—"III"

A given portion of a silicon nitride based ceramic wear tip was cleaned, and the tip was welded to a steel body fablicated of SNCM 630 (JIS). For this welding, a nickel plate (Ni) having a thickness of 0.5 mm was used as the buffer member, and a Ti-Ag-Cu solder was applied to the contacting portion between the tip and the body and heated at 900° C. for 10 minutes. The body was then cooled to a degree of about 300° C. in a nitrogen gas atmosphere for 20 minutes. The body thus cooled exhibited the hardness of 45.3 in $H_RC$. After annealing at a temperature of 200° C., the body showed the hardness of 44.1 in $H_RC$.

It is to be noted that the methods for producing the EXAMPLES and the results of the same are briefly described in TABLE-1.

REFERENCE—"I"

In order to evaluate the characterists of the EXAMPLES thus produced, a reference rocker arm was also produced. For this production, the same procedure as the EXAMPLE "I" was carried out except that in this REFERENCE, the body was fabricated of a thermally refined steel of S40C (JIS). After welding of a ceramic tip to the steel body, the latter showed the hardness of 5 in $H_RC$.

The four rocker arms of the above-mentioned EXAMPLES and REFERENCE were subjected to an endurance test by operating a 2000 CC four-cylinder gasoline engine at 6000 rpm. The rocker arm of the REFERENCE was broken after about 10 hours from the test start. However, the rocker arms of the EXAMPLES showed no troubles.

It is to be noted that if the metal body is to be machined after welding of a ceramic tip thereto, using a body having the hardness less than 35 in $H_RC$ is preferable.

As is seen from the foregoing description, the produced body, viz., rocker arm, according to the present invention can use as its structural base a low-priced steel body which contains a small amount of Chrome (Cr). When the ceramic tip and the green steel body have been previously machined finely, the welding of the tip to the body can increase the hardness of the body. This induces a compact and light weight construction of the produced body.

Although the above description is directed to a rocker arm, the concept of the present invention is also applicable to other engine compartments such as intake valve, exhaust valve, valve lifter, piston, turbo-charger rotor and the like.

TABLE 1

| Example | Tip | Body | Surface Treatment | Solder | Buffer Member | Soldering Condition | Cooling Condition | Hardness ($H_RC$) (Before Annealing) | Hardness ($H_RC$) (After Annealing) |
|---|---|---|---|---|---|---|---|---|---|
| I | Si$_3$N$_4$ | Steel (JIS.SNCM616) | Physically Sputtering Method | Ag—Cu | Cu | Vacuum 925° C. · 10 min. | N$_2$-gas | 35.6 | 34.5 |
| II | Si$_3$N$_4$ | See Table II | Activated Metal Method | Ti—Cu | Cu | Vacuum 925° C. · 5 min. | N$_2$-gas | 30.2 | — |
| III | Si$_3$N$_4$ | Steel (JIS.SNCM630) | Activated Metal Method | Ti—Ag—Cu | Ni | Vacuum 900° C. · 10 min. | N$_2$-gas | 45.3 | 44.1 |

TABLE II

| | (wt %) | | | | | | | |
|---|---|---|---|---|---|---|---|---|
| Example | C | Si | Mn | P | S | Ni | Cr | Mo |
| I | 0.13~0.20 | 0.15~0.35 | 0.08~1.20 | less than 0.03 | less than 0.03 | 2.80~3.20 | 1.40~1.80 | not less than 0.40 |
| II | 0.07~0.13 | 0.15~0.35 | 0.08~1.20 | less than 0.03 | less than 0.03 | 2.80~3.20 | 1.40~1.80 | not less than 0.40 |
| III | 0.25~0.35 | 0.15~0.35 | 0.35~0.6 | less than 0.03 | less than 0.03 | 2.50~3.50 | 2.50~3.50 | 0.50~0.70 |

What is claimed is:

1. A rocker arm for use in an internal combustion engine, comprising:

a base body fabricated of a Ni-Cr-Mo steel comprising about 0.3 to 1.5 wt % Mn, about 1 to 5 wt % Ni, less than about 8 wt % Cr, less than about 1.5 wt % Mo, about 1 wt % Si, less than about 1 wt % W, less than about 1 wt % V, not less than about 0.04 wt % C and a trace of S and P an unavoidable impurities;

a silicon nitride base ceramic tip;

a buffer plate selected from a group consisting of a copper plate and a nickel plate, said buffer plate being interposed between said ceramic tip and a portion of said base body; and a solder bonding said ceramic tip to said portion of said base body with said buffer plate interposed therebetween, said solder being selected from a group consisting of a Ag-Cu solder, a Ti-Cu solder and a Ti-Ag-Cu solder.

2. A rocker arm according to claim 1, wherein said buffer plate between said ceramic tip and base is a copper plate and said solder is an Ag-Cu solder.

3. A rocker arm according to claim 1, wherein said buffer plate between said ceramic tip and base is a copper plate and said solder is a Ti-Cu solder.

4. A rocker arm according to claim 1, wherein said buffer plate between said ceramic tip and base is a copper plate and said solder is a Ti-Ag-Cu solder.

5. A rocker arm according to claim 1, comprising at least about 1.4% Cr.

6. A rocker arm according to claim 5, wherein said buffer plate between said ceramic tip and base is a copper plate and said solder is an Ag-Cu solder.

7. A rocker arm according to claim 5, wherein said buffer plate between said ceramic tip and base is a copper plate and said solder is a Ti-Cu solder.

8. A rocker arm according to claim 5, wherein said buffer plate between said ceramic tip and base is a copper plate and said solder is a Ti-Ag-Cu solder.

9. A rocker arm according to claim 1, having a Rockwell hardness of at least 20.

10. A rocker arm according to claim 9, having a Rockwell hardness between 20 and 35.

* * * * *